US008442987B2

(12) United States Patent
Leggetter et al.

(10) Patent No.: US 8,442,987 B2
(45) Date of Patent: May 14, 2013

(54) METHOD AND SYSTEM FOR PROVIDING CONTENTS BASED ON PAST QUERIES

(75) Inventors: Chris Leggetter, Belmont, CA (US); Anish Nair, Fremont, CA (US); Karim Filali, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 142 days.

(21) Appl. No.: 12/859,277

(22) Filed: Aug. 19, 2010

(65) Prior Publication Data

US 2012/0047151 A1 Feb. 23, 2012

(51) Int. Cl.
*G06F 17/30* (2006.01)

(52) U.S. Cl.
USPC ........... 707/749; 707/706; 707/713; 707/722; 707/736; 706/12

(58) Field of Classification Search ........................ None
See application file for complete search history.

(56) References Cited

U.S. PATENT DOCUMENTS

| 6,175,829 | B1 * | 1/2001 | Li et al. ................................. 1/1 |
| 8,135,698 | B2 * | 3/2012 | Dettinger et al. ............. 707/708 |
| 2005/0060311 | A1 * | 3/2005 | Tong et al. ........................ 707/7 |
| 2006/0074870 | A1 * | 4/2006 | Brill et al. ......................... 707/3 |
| 2006/0224554 | A1 * | 10/2006 | Bailey et al. ...................... 707/1 |
| 2007/0203894 | A1 * | 8/2007 | Jones et al. ....................... 707/3 |
| 2007/0214131 | A1 * | 9/2007 | Cucerzan et al. ................ 707/5 |
| 2008/0077588 | A1 * | 3/2008 | Zhang et al. ...................... 707/6 |
| 2008/0114721 | A1 * | 5/2008 | Jones et al. ....................... 707/2 |
| 2009/0024613 | A1 * | 1/2009 | Niu et al. .......................... 707/5 |
| 2009/0216710 | A1 * | 8/2009 | Chang et al. ..................... 707/2 |
| 2010/0198857 | A1 * | 8/2010 | Metzler et al. ................ 707/768 |

OTHER PUBLICATIONS

Altiparmak et al, "Automated Data Discovery in Similarity Score Queries", Springer-Verlag Berlin Heidelberg, 2008.*
Bona e al, "Learning Dense Models of Query Similarity from User Click Logs", Zurich, Feb. 2010.*
Bordino et al, "Query Similarity by Projecting the Query-Flow Graph", ACM, Jul. 2010.*
Fonseca et al, "Using association rules to discover search engines related queries", IEEE, 2003.*
Yates et al, "Query Recommendation using Query Logs in Search Engines", 2004.*

(Continued)

*Primary Examiner* — Hung Le
(74) *Attorney, Agent, or Firm* — Evergreen Valley Law Group, P.C.; Kanika Radhakrishnan (57) ABSTRACT

An example of a method includes identifying a formulated query and at least one past query associated with an input query. The method also includes determining a first similarity score between the input query and the formulated query. Further, the method includes updating the first similarity score based on a second similarity score between the input query and the at least one past query, and based on a third similarity score between the formulated query and the at least one past query. Moreover, the method includes extracting one or more contents based on the formulated query if updated first similarity score is greater than a first threshold. The method also includes providing the one or more contents.

17 Claims, 4 Drawing Sheets

OTHER PUBLICATIONS

Alcock et al, "Time-Series Similarity Queries Employing a Feature-Based Approach", 2007.*

Chien et al, "Semantic Similarity Between Search Engine Queries Using Temporal Correlation", 2005.*

Zaiane et al, "Finding Similar Queries to Satisfy Searches based on Query Traces", 2002.*

Zhao et al, "Time-Dependent Semantic Similarity Measure of Queries Using Historical Click-Through Data", 2006.*

Bona et al, "Learning Dense Models of Query Similarity from User Click Logs", Mar. 2010.*

Rosie Jones, Benjamin Rey, Omid Madani and Wiley Greiner, "Generating Query Substitutions", Published in Proceedings of the Fifteenth International Conference on the World-Wide Web (WWW06), Year 2006, pp. 387-396.

Dustin Hillard, Stefan Schroedl, Eren Manavoglu, Hema Raghavan and Chris Leggetter, "Improving Ad Relevance in Sponsored Search", Published in Web Search and Web Data Mining, Proceedings of the Third ACM International Conference on Web Search and Data Mining, New York, New York, USA, Year of Publication: 2010, ISBN:978-1-60558-889-6, Session: ADS, pp. 361-370.

* cited by examiner

METHOD AND SYSTEM FOR PROVIDING CONTENTS BASED ON PAST QUERIES

BACKGROUND

There exist several search engines, for example Yahoo!®, or other mechanisms to search results on internet and to provide the results to a user. The search engines depend on one or more probabilistic models, or algorithms to provide the results to the user in response to a query inputted by the user. Query reformulation or query rewriting is a technique that is often used by search engines for identifying the results that are relevant to the query. The query reformulation includes determining similarity scores among various queries to identify several queries that are logically similar to the query inputted by the user. The results are then identified based on determined queries. However, the query reformulation is a challenge in itself. Moreover, it is desired to perform query reformulation accurately and efficiently in presence of increasing queries or contents such as user history.

SUMMARY

An example of a method includes identifying a formulated query and at least one past query associated with an input query. The method also includes determining a first similarity score between the input query and the formulated query. Further, the method includes updating the first similarity score based on a second similarity score between the input query and the at least one past query, and based on a third similarity score between the formulated query and the at least one past query. Moreover, the method includes extracting one or more contents based on the formulated query if updated first similarity score is greater than a first threshold. The method also includes providing the one or more contents.

An example of an article of manufacture includes a machine-readable medium and instructions carried by the medium and operable to cause a programmable processor to perform identifying a formulated query and at least one past query associated with an input query. Further, the machine-readable medium carries instructions operable to cause the programmable processor to perform determining a first similarity score between the input query and the formulated query. Furthermore, the machine-readable medium carries instructions operable to cause the programmable processor to perform updating the first similarity score based on a second similarity score between the input query and the at least one past query, and based on a third similarity score between the formulated query and the at least one past query. The machine-readable medium also carries instructions operable to cause the programmable processor to perform extracting one or more contents based on the formulated query if updated first similarity score is greater than a first threshold. Moreover, the machine-readable medium carries instructions operable to cause the programmable processor to perform providing the one or more contents.

An example of a server includes a server communication interface, a server memory to store server instructions, and a server processor coupled to the server memory. The server processor is responsive to the server instructions to identify a formulated query and at least one past query associated with an input query. The server processor is also responsive to the server instructions to determine a first similarity score between the input query and the formulated query. Further, the server processor is responsive to the server instructions to update the first similarity score based on a second similarity score between the input query and the at least one past query, and based on a third similarity score between the formulated query and the at least one past query. The server processor is also responsive to server instructions to extract one or more contents based on the formulated query if updated first similarity score is greater than a first threshold. In addition, the server processor is responsive to the server instructions to provide the one or more contents.

Another example of a method includes identifying an object associated with an input query and at least one past query associated with the input query. The method also includes determining a first similarity score between the input query and the object. Further, the method includes updating the first similarity score based on a second similarity score between the input query and the at least one past query, and based on a third similarity score between the object and the at least one past query. Moreover, the method includes providing the object if updated first similarity score is greater than a first threshold.

DETAILED DESCRIPTION OF THE EMBODIMENTS

Figure 1:
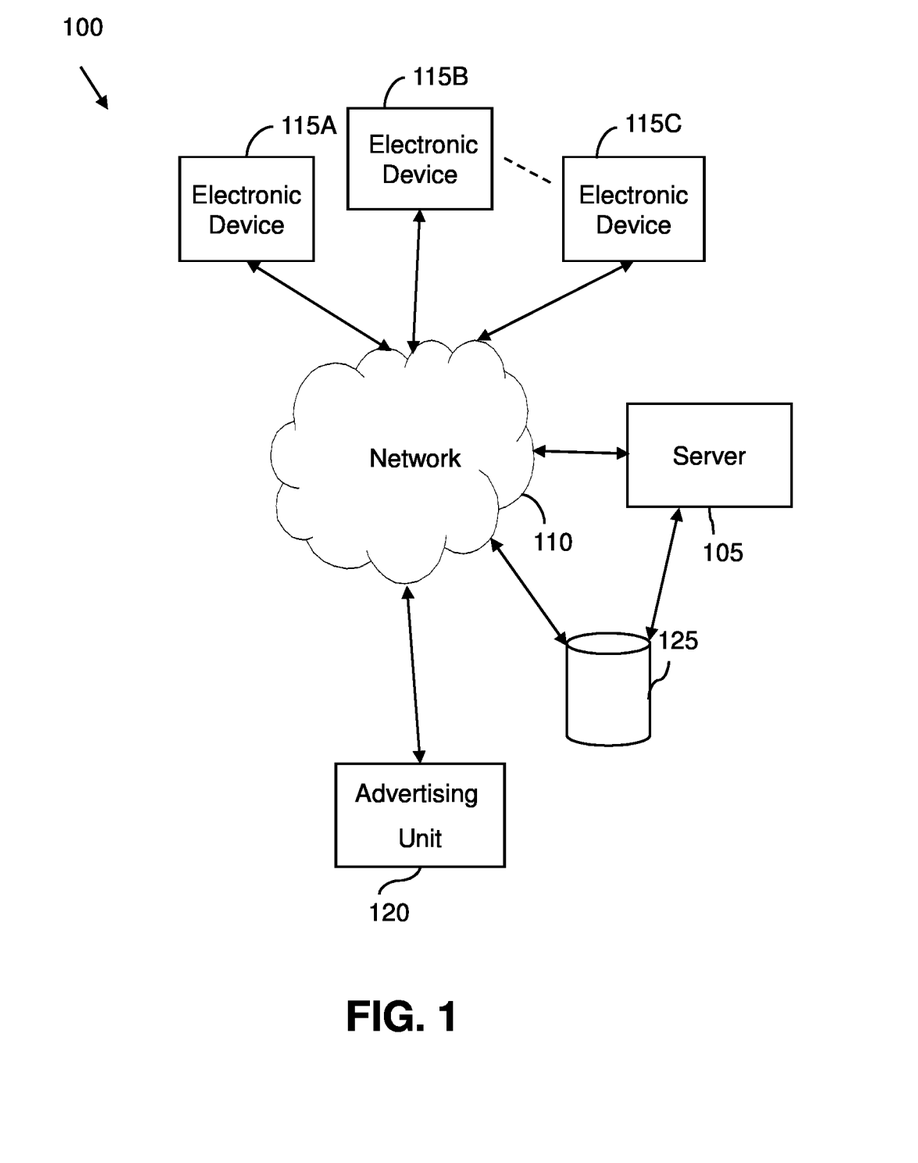
FIG. 1 is a block diagram of an environment, in accordance with one embodiment.

FIG. 1 is a block diagram of an environment 100. The environment 100 includes a server 105, for example a Yahoo!® server, connected to a network 110. Examples of the network 110 include, but are not limited to, a Local Area Network (LAN), a Wireless Local Area Network (WLAN), a Wide Area Network (WAN), wired network, wireless network, internet and a Small Area Network (SAN).

The server 105 processes data and can include one or more hardware elements. The server 105 including hardware elements is explained in detail in conjunction with FIG. 3.

The environment 100 further includes one or more electronic devices, for example an electronic device 115A, an electronic device 115B, and an electronic device 115C that can communicate with each other through the network 110. Examples of the electronic devices include, but are not limited to, computers, mobile phones, laptops, palmtops, and personal digital assistants (PDAs). The electronic devices can also communicate with the server 105 through the network 110.

The environment 100 includes an advertising unit 120. The advertising unit 120 communicates with the server 105 through the network 110. The advertising unit 120 can also have hardware configuration equivalent to that of the server 105 but for performing different operation. In one example, the advertising unit 120 can be an advertisement server that processes functionalities related to advertisements.

The server 105 can be coupled to a storage device 125 through the network 110 or directly. The advertisements can be stored in the storage device 125. The functionality of the server 105 is now discussed using two use cases.

Use Case 1

A user of the electronic device 115A can access a search website, for example Y! search, to search results on internet.

The user enters a keyword or a set of keywords, hereinafter referred to as an input query. The search website or search engine searches the internet and provides results in response to the input query. The search website can be hosted by the server 105. In addition to the results the search website also provides or displays other contents. For example, advertisements that are associated with the input query or relevant to the input query can be displayed. Advertisements can be in form of text, animation, or any other format, and can be referred to as sponsored search results or sponsored content or sponsored advertisements or sponsored links. Displaying the advertisements help the search websites generate revenue. If the advertisements are relevant to context of the input query then it is highly likely that the user will be interested in the advertisement and will click on the advertisement. The click on the advertisement further increases the revenue generation. Hence, it is desired to provide relevant advertisements to the user. The relevant advertisement can be identified by identifying intent of the user. The intent of the user can be identified using the input query.

The server 105 can obtain the advertisements from the advertising unit 120 and store the advertisements in the storage device 125 or can fetch the advertisements from the advertising unit 120 directly.

For identifying relevant advertisements, the server 105 first identifies formulated queries and past queries associated with the input query.

The server 105 identifies the past queries that are associated with the user from a query history. A past query can be a keyword or a string inserted by the user during a previous search interaction of the user with the search website. A user could have visited the search website earlier and inserted the input query or a different query earlier. All such past queries can be stored by the server 105 in the storage device 125 as the query history.

The server 105 retrieves the query history from the storage device 125 as and when desired. The query history can be updated on periodic basis and old queries can be removed.

The server 105 checks similarity scores between each past query and the input query against a predefined threshold (also referred to as a second threshold). If the similarity score exceeds the second threshold then the server 105 identifies that past query as a past query associated with the input query. Many such past queries associated with the input query can be identified.

Various techniques can be used for computing the similarity scores. For example a technique described in a publication titled, "*Generating Query Substitutions*", authored by Rosie Jones, Benjamin Rey, Omid Madani and Wiley Greiner, and published in *Proceedings of the Fifteenth International Conference on the World-Wide Web* (WWW06), pages 387-396, year 2006 can be used.

The server 105 identifies the formulated queries by using various techniques. For example a technique described in a publication titled, "*Generating Query Substitutions*", authored by Rosie Jones, Benjamin Rey, Omid Madani and Wiley Greiner, and published in Proceedings of the *Fifteenth International Conference on the World-Wide Web* (WWW06), pages 387-396, year 2006 can be used. The techniques can include extracting the formulated queries using one or more sources. Example of the one or more sources include, but are not limited to, sessions, bipartite query-url graphs, session based rewrites, and query segment substitutions.

There can be several formulated queries associated with the input query. All such formulated queries might not be relevant. The server 105 then disambiguates the formulated queries to identify a formulated query from the formulated queries that satisfy predefined criteria. The formulated query satisfying the predefined criteria can be referred to as a relevant query. The predefined criteria include checking if an updated similarity score associated with the formulated query exceeds a first threshold. The first threshold can be a predefined numerical value defined by the server 105. The server 105 determines the updated similarity score associated with the formulated query.

The relevant query is then used by the server 105 to identify the relevant advertisements.

It is noted that more than one formulated query can satisfy the predefined criteria. All such formulated queries can be considered for identifying relevant advertisements.

The server 105 determines the formulated queries that satisfy the predefined criteria by determining a similarity score between the input query and a formulated query of the formulated queries. The server 105 also determines the similarity scores between the input query and the formulated queries.

The similarity scores can be determined by the server 105 using various techniques, for example a technique described in a publication titled, "*Generating Query Substitutions*", authored by Rosie Jones, Benjamin Rey, Omid Madani and Wiley Greiner, and published in *Proceedings of the Fifteenth International Conference on the World-Wide Web* (WWW06), pages 387-396, year 2006 can be used. The similarity score is a numerical value which signifies strength of similarity between two strings or two keywords.

The server 105 also determines similarity scores between the input query and the past queries. The server 105 further determines similarity scores between the formulated queries and the past queries.

The server 105 updates each similarity score between the input query and the formulated queries based on the input query, the formulated queries and the past queries to yield an updated similarity score. Updating is explained with an example in conjunction with FIG. 2. One updated similarity score is generated for the input query and the formulated query. The updating is dependent on the similarity scores between the input query and the past queries, the similarity scores between the formulated queries and the past queries, and the similarity scores between the input query and the formulated queries.

It is noted that various thresholds mentioned in the present disclosure are determined empirically by testing many values on held-out data.

The server 105 then checks if any updated similarity scores exceed the first threshold. The first threshold is a minimum relevance threshold. The server 105 then identifies the formulated query for which the updated similarity score exceeds the first threshold as the relevant query. The server 105 then fetches the advertisements based on the formulated query. The fetched advertisements are relevant to the input query and can be referred to as the advertisements associated with the input query.

The server 105 then displays the advertisements associated with the formulated query to the user through corresponding electronic device. The user can click on an advertisement which further helps the server 105 to generate revenue. Thus the server 105 provides advertisements relevant to the input query to the user in a short time without depending on the user to reformulate the input query.

The server 105 also disambiguates the formulated queries associated with the updated similarity scores that exceed the first threshold. Thus the server 105 determines the relevant query in response to the user inserting the input query to display advertisements associated with the relevant query. Disambiguating the formulated queries helps in filtering irrelevant advertisements, improving quality of the search website and enhancing user experience. Disambiguating can be referred to as eliminating that formulated query as being relevant to the input query for that session.

Use Case 2

The server 105 identifies an object associated with the input query. Examples of the object include an advertisement, a web page, and a document.

The use case is now explained using advertisement as the object.

The server 105 also determines a first similarity score between the advertisement and the input query. The server 105 can identify the advertisement and the first similarity score using various techniques, for example a technique described in a publication titled, "*Improving Ad Relevance in Sponsored Search*", authored by Dustin Hillard, Stefan Schroedl, Eren Manavoglu, Hema Raghavan and Chris Leggetter, and published in *Web Search and Web Data Mining, Proceedings of the third ACM international conference on Web search and data mining*, New York, N.Y., USA, SESSION: Ads, Pages: 361-370, Year of Publication: 2010, ISBN: 978-1-60558-889-6.

The server 105 identifies the at least one past query. Many past queries can be identified. The explanation is now provided using one past query and the explanation is applicable for all identified past queries.

The server 105 updates the first similarity score based on the input query, the past query and the advertisement. The server 105 determines a second similarity score between the input query and the past query, and a third similarity score between the advertisement and the past query. The server 105 updates the first similarity score using the second similarity score and the third similarity score. The server 105 then checks updated first similarity score against a threshold (first threshold). If the update first similarity score exceeds the threshold then the advertisement is provided else the advertisement is discarded.

Figure 2:
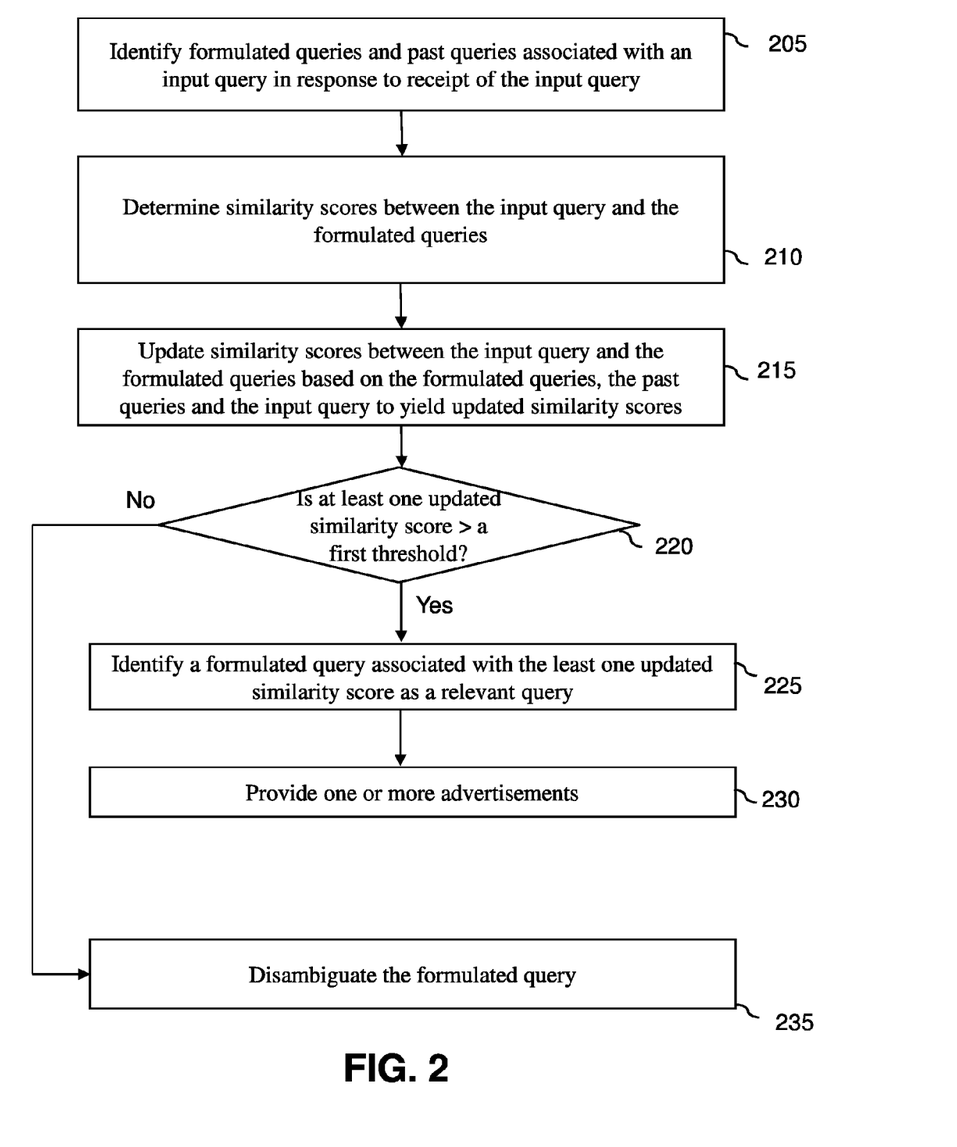
FIG. 2 is a flow diagram illustrating a method for providing one or more contents, in accordance with one embodiment.

FIG. 2 is a flow diagram illustrating a method for providing one or more contents, for example advertisements, by a server, for example the server 105. The advertisements can be displayed to a user of an electronic device, for example the electronic device 115A.

The user of the electronic device can access the search website to search the results on the internet by entering input query in the search website. The search website searches the internet and provides results in response to the input query. In addition to the results the search website also displays the advertisements that are associated with the input query or relevant to the input query. Displaying the advertisements helps the search websites generate revenue. Hence, it is desired to provide relevant advertisements to the user.

The server can obtain the advertisements from an advertising unit, for example the advertising unit 120 and store the advertisements in a storage device, for example the storage device 125 or can fetch the advertisements from the advertising unit directly.

The following steps provide an explanation for identifying the relevant advertisements by the server.

At step 205, the formulated queries and the past queries associated with the input query are identified in response to the input query.

The past queries associated with the user, from the query history are identified. The past queries are identified by checking similarity scores between each past query and the input query against a predefined threshold (also referred to as a second threshold). If the similarity score exceeds the second threshold then that past query is identified as a past query associated with the input query. Many such past queries associated with the input query can be identified.

The past queries that exceed the second threshold are identified as the past queries associated with the input query.

At step 210, the similarity scores between the input query and the formulated queries are determined. One similarity score (a first similarity score) is determined between the input query and one formulated query.

At step 215, the similarity scores between the input query and the formulated queries are updated to yield the updated similarity scores. The similarity scores between the input query and the past queries, and the similarity scores between the formulated queries and the past queries are also determined. A similarity score between the input query and a past query is referred to as a second similarity score. A similarity score between a formulated and a past query is referred to as a third similarity score. The first similarity score is updated based on the first similarity score, the second similarity score and the third similarity score. The first similarity score is updated, for example by using the below-mentioned equation.

$$s^{new}(q,r) = w_0 s(q,r) + (1-w_0)\Sigma^m_{i=1}[s(v_i,r)*s(q,v_i)/\Sigma_j s(Q,v_j)]$$

Where "q" is the input query, $V=\{v_1, v_2, \ldots v_m\}$, "V" is a set of the past queries, $R=\{r_1, r_2, \ldots r_n\}$ "R" is a set of the formulated queries, let r be a formulated query belonging to the set of the formulated queries for which an updated similarity score ($s^{new}$ (q, r)) is determined, "$w_h$" is history weight and is a predefined numerical value, "α" is history contribution cutoff value and is a predefined numerical value, "s(q, r)" is similarity score between the input query and the formulated query (r), "s(q,$v_i$)" are similarity scores between the input query and the past queries and is determined for each v ∈ V;

"s($V_i$, r)" is the similarity scores between the formulated query (r) and the past queries and is determined for each v ∈ V;

"$w_0$"=[(1−$w_h$)*β],

"β"=0.0, if [maximum of s(q, $v_i$)<α] else "β"=max s(q, $v_i$).

The above-mentioned equation yields the updated similarity score ($s^{new}$ (q, r)) for a single formulated query (r) belonging to the formulated queries (R). When the equation is applied to each formulated query then the equation yields the updated similarity scores for each formulated query. For example, the equation can be applied to a formulated query $r_2$ to yield an updated similarity score ($s^{new}$ (q, $r_2$)). The equation can also be applied to a formulated query $r_3$ to yield an updated similarity score ($s^{new}$ (q, $r_3$)). Thus the updated similarity score ($s^{new}$ (q, r)), the updated similarity score ($s^{new}$ (q, $r_2$)) and the updated similarity score ($s^{new}$ (q, $r_3$)) can be referred to as the updated similarity scores for the formulated queries r, $r_2$, and $r_3$ It is noted that various other equations can also be used for obtaining the updated similarity score based on the input query, the past queries associated with the input query and the formulated queries.

At step 220, a check is performed to determine if at least one updated similarity score of the updated similarity scores exceed the first threshold. If the at least one updated similarity score, for example the updated similarity score ($s^{new}$ (q, r)), exceeds the first threshold then step 225 is performed else step 235 is performed.

At step 225, the formulated query associated with the at least one updated similarity score is identified as the relevant query. For example, the formulated query r associated with the updated similarity score ($s^{new}(q, r)$) is identified as the relevant query.

At step 230, the advertisements relevant to the formulated query associated with the least one updated similarity score are provided to the user. The advertisements can be provided to the user by displaying the advertisements on the display of the electronic device.

At step 235, a formulated query, for example the formulated query $r_2$, is disambiguated.

The method described above is now explained with help of an example. During a search interaction of a user with a search website the user intends to get search results associated with jaguar soft toys. The user inserts an input query "Jaguar" ("q") in the search website. The user is unaware that the input query "jaguar" could be interpreted by the search engine as being associated with various domains, for example animal domain, car domain and soft toys domain.

The server 105 receives the input query "jaguar" from the user. The server 105 identifies a first past query "tiger" ("$v_1$"), a second past query "animal toys" ("$v_2$"), and third past query "kid toys" ("v3") associated with the user. The similarity scores $s(q,v_i)$ between the input query and the past queries are determined as follows. Each $s(q,v_i)$ is referred to as a second similarity score.

$s(q,v_1)$=0.8, similarity score between jaguar and tiger
$s(q,v2)$=0.7, similarity score between jaguar and animal toys
$s(q,v_3)$=0.5, similarity score between jaguar and kid toys In the illustrated example, the similarity scores corresponding to the first past query "tiger" and the second past query "animal toys" exceed the second threshold (0.51). Thus the server 105 identifies that the first past query "tiger" and the second past query "animal toys" are relevant to the input query "Jaguar". The first past query and the second past query are identified as at least one past query.

The server 105 also identifies a first formulated query "jaguar car" ("$r_1$"), a second formulated query "jaguar soft toy cub" ("$r_2$"), and a third formulated query "bmw" ("$r_3$") using the sources. The server 105 determines similarity scores $s(q,r_j)$ (first similarity scores) between the input query and each formulated query. The first similarity score between the input query and each formulated query is determined as follows. Each $s(q,r_j)$ is referred to as a second similarity score.

$s(q,r_1)$=0.85, similarity score between jaguar and jaguar car
$s(q,r_2)$=0.75, similarity score between jaguar and animal jaguar soft toy cub
$s(q,r_3)$=0.7, similarity score between jaguar and bmw Similarity scores $s(v_i,r_j)$(third similarity scores) are also determined between the formulated queries and the past queries. For each formulated query the first similarity score is then updated using the second similarity score and the third similarity scores. For example, for the first formulated query $r_1$ the following calculations are performed.

$s(v_1,r_1)$=0.3, between tiger and jaguar car
$s(v_2,r_1)$=0.6, between animal toys and jaguar car
$s(v_3,r_1)$=0.8, between kid toys and jaguar car $$s^{new}(q,r_1)=w_0 s(q,r_1)+(1-w_0)\Sigma^m_{i=1}s(v_i,r_1)*s(q,v_i)/\Sigma_j s(q,v_j)$$

$$s^{new}(q,r_1)=0.76*0.85+0.24[(0.3*0.8/2.0)+(0.6*0.7/2.0)+(0.8*0.5/2.0)]$$

$s^{new}(q, r1)$=0.77 where "$w_h$" is the history weight. Let "$w_h$" be 0.3, "β"=0.0, if [maximum of $s(q, v_i)<\alpha$] else "β"=max $s(q, v_i)$, "α" is a predefined value. Let "α" be 0.2. Also, maximum of $s(q, v_i)$ is 0.8 and 0.8>0.2, thus "β"=0.8, "$w_0$"=[(1−$w_h$)*β], thus "$w_0$"=[(1−0.3)*0.8]=0.76.

The first similarity score between the input query "jaguar" and the first formulated query "jaguar car" reduced from 0.85 to 0.77. The decrease in value is in sync with intent of the user as the user is interested in jaguar soft toys.

Similarly, for each formulated query the first similarity score is then updated using the second similarity score and the third similarity scores. The updated similarity scores are then checked against the first threshold. In illustrated example, the first threshold is 0.8 and the second formulated query "jaguar soft toy cub" exceeds the threshold, and hence the second formulated query is identified as relevant query. Other queries "jaguar car" and "bmw" are discarded. Advertisements based on "jaguar soft toy cub" are then identified and provided.

Figure 3:
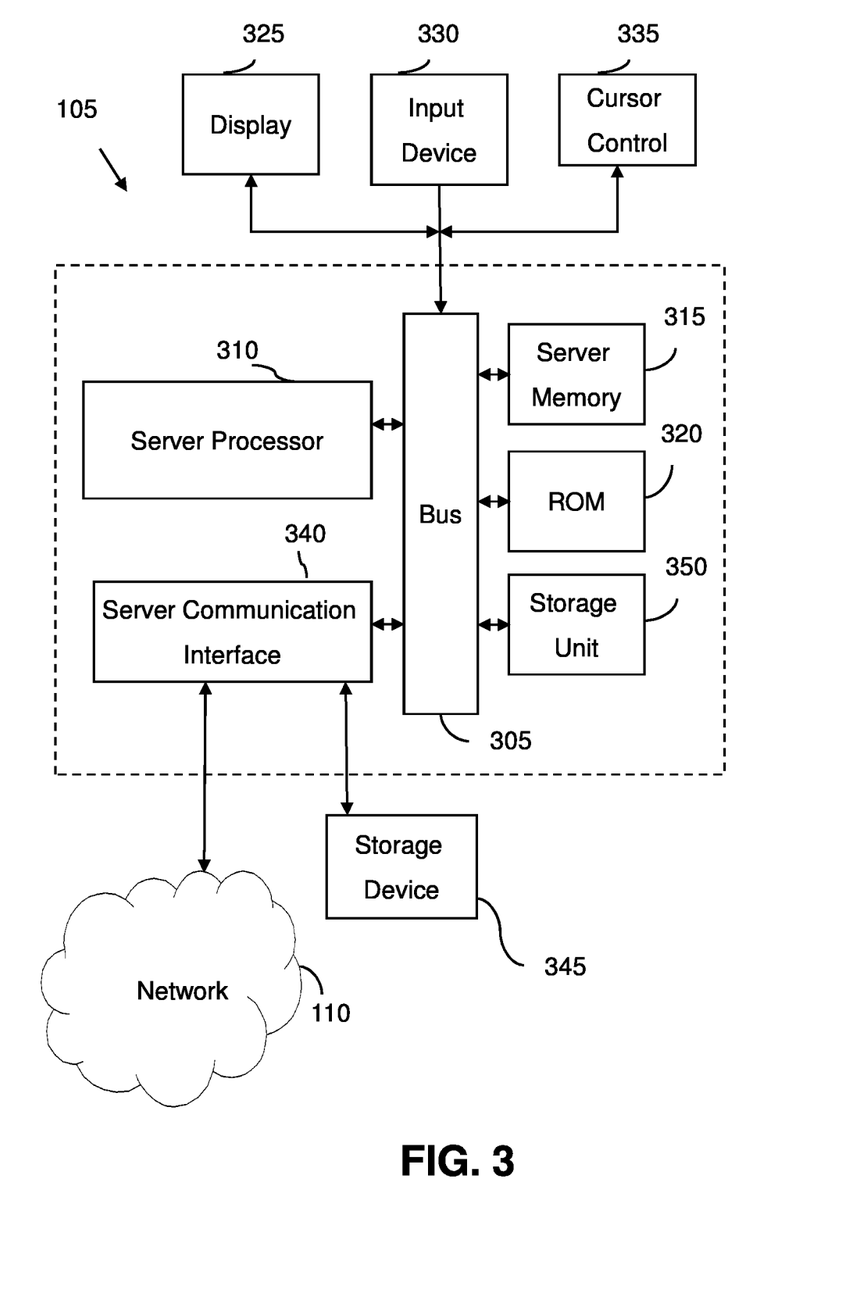
FIG. 3 is a block diagram of a server, in accordance with one embodiment.

FIG. 3 is a block diagram of the server 105.

The server 105 includes a bus 305 for communicating information, and a server processor 310 coupled with the bus 305 for processing information. The server 105 also includes a server memory 315, for example a random access memory (RAM) coupled to the bus 305 for storing instructions to be executed by the server processor 310. The server memory 315 can be used for storing temporary information required by the server processor 310. The server 105 further includes a read only memory (ROM) 320 or other static storage unit coupled to the bus 305 for storing static information and instructions for the server processor 310. A storage unit 350, such as a magnetic disk or hard disk, can be provided and coupled to the bus 305 for storing information.

The server 105 can be coupled via the bus 305 to a display 325, for example a cathode ray tube (CRT) or liquid crystal display (LCD), for displaying information. An input device 330, including various keys, is coupled to the bus 305 for communicating information and command selections to the server processor 310. In some embodiments, a cursor control 335, for example a mouse, a trackball, a joystick, or cursor direction keys, for command selections and for controlling cursor movement on the display 325 can also be present. In some embodiments, the display 325, for example a touch screen, can be used to provide inputs.

Figure 4:
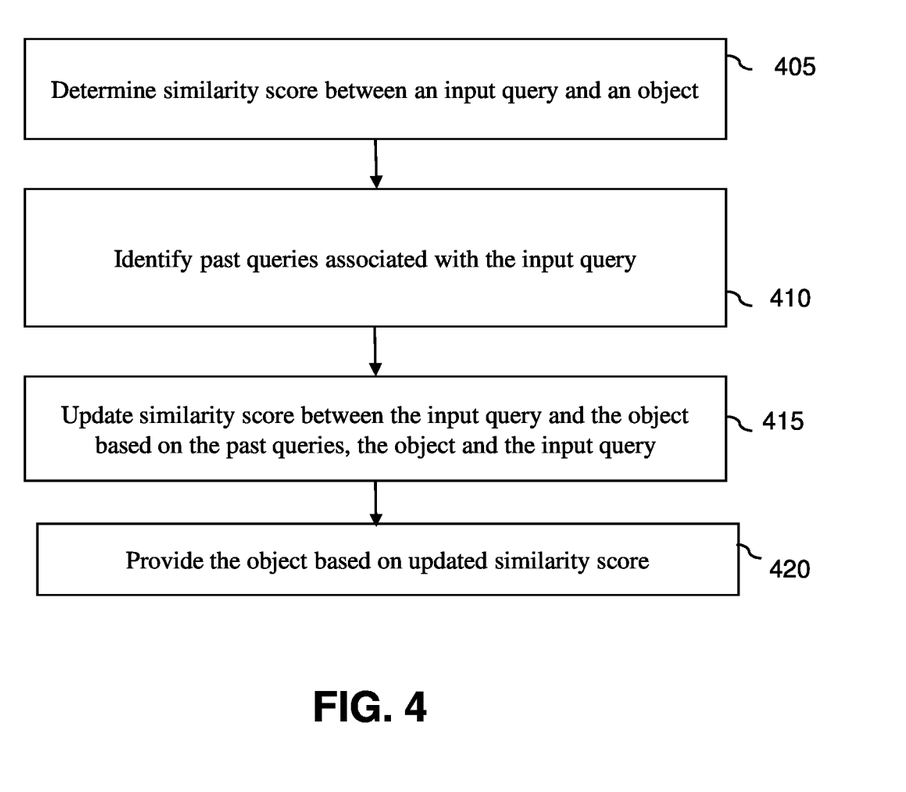
FIG. 4 is a flow diagram illustrating a method for providing an object, for example an advertisement, in accordance with one embodiment.

Various embodiments are related to use of the server 105 for implementing techniques described herein, for example technique described in FIG. 2 and FIG. 4. The techniques can be performed by the server 105 in response to execution of instructions in the server memory 315 by the server processor 310. The instructions can be read into the server memory 315 from another machine-readable medium, such as the storage unit 350.

The term machine-readable medium can be defined as a medium providing data to a machine to enable the machine to perform a specific function. The machine-readable medium can include storage media. Storage media can include non-volatile media and volatile media. The server memory 315 can be volatile media. All such media must be tangible to enable the instructions carried by the media to be detected by a physical mechanism that reads the instructions into the machine.

Examples of the machine readable medium include, but are not limited to, a floppy disk, a flexible disk, hard disk, magnetic tape, a CD-ROM, optical disk, punchcards, papertape, a RAM, a PROM, EPROM, and a FLASH-EPROM.

In some embodiments, the machine-readable medium can be transmission media including coaxial cables, copper wire and fiber optics, including the wires that include the bus 305. The machine-readable medium can also support radio-wave and infra-red data communications that generate acoustic or light waves. Other examples of the machine-readable medium can include but are not limited to carrier waves as described hereinafter or any other media from which the server 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 305. The bus 305 carries the data to the server memory 315, from which the server processor 310 retrieves and executes the instructions. The instructions received by the server memory 315 can optionally be stored in the storage unit 350 either before or after execution by the server processor 310.

The server 105 also includes a server communication interface 340 coupled to the bus 305 for enabling data communication. Examples of the server communication interface 340 include, but are not limited to, an integrated services digital network (ISDN) card, a modem, a local area network (LAN) card, an infrared port, a Bluetooth port, a zigbee port, and a wireless port.

The server 105 can be coupled to a storage device 345. The storage device 345 includes the database including the query history, formulated queries for which the updated first similarity scores exceed the first threshold, and the advertisements. In some embodiments, the database can be stored in the server 105.

In some embodiments, the server processor 310 can include one or more processing units for performing one or more functions of the server processor 310. The processing units are hardware circuitries that perform specified functions.

The server 105 is also capable of ranking or prioritizing the formulated queries, if for more than one formulated query the updated similarity score exceed the first threshold.

The server 105 filters irrelevant advertisements by disambiguating the formulated queries which fall below the first threshold.

The server 105 is capable of handling long mixed-goal sessions. The server 105 does not need to explicitly break a long session into different goals, thereby improving computational speed. Each past query is evaluated independently for relevance to the input query. The server 105 avoids imposing session segmentation. Further, the server 105 uses the method described in FIG. 2 to reduce the scarcity problems. The method requires a fixed number of parameters in contrast to an approach in which the number of parameters is proportional to the size of all possible session histories and hence is able to handle rare queries and sessions.

FIG. 4 is a flow diagram illustrating a method for providing an object, for example an advertisement.

At step 405, a similarity score is determined between the input query and the advertisement. Various techniques, for example a technique described in a publication titled, "Improving Ad Relevance in Sponsored Search", authored by Dustin Hillard, Stefan Schroedl, Eren Manavoglu, Hema Raghavan and Chris Leggetter, and published in *Web Search and Web Data Mining, Proceedings of the third ACM international conference on Web search and data mining*, New York, N.Y., USA, SESSION: Ads, Pages: 361-370, Year of Publication: 2010, ISBN: 978-1-60558-889-6, can be used for determination of the similarity score between the input query and the advertisement.

At step 410, past queries associated with the input query are identified.

At step 415, the similarity score is updated based on the past queries, the advertisement, and the input query. Various algorithms or equations can be used for updating the similarity scores. One way of updating the first similarity score is described in FIG. 2 as an example.

At step 420, the advertisement is provided based on the updated similarity score. If the similarity score exceeds the first threshold then the advertisement is provided else the advertisement is discarded.

Steps 405 to 420 can be performed for multiple advertisements together. The advertisements for which the first threshold requirement is met are shortlisted and displayed.

While exemplary embodiments of the present disclosure have been disclosed, the present disclosure may be practiced in other ways. Various modifications and enhancements may be made without departing from the scope of the present disclosure.

The present disclosure is to be limited only by the claims.

What is claimed is:

1. A method comprising:
identifying a formulated query and at least one past query associated with an input query;
determining a first similarity score between the input query and the formulated query;
electronically updating the first similarity score based on the formulated query, the
input query, and the at least one past query, wherein updating the first similarity score includes updating the first similarity score based on a second similarity score between the input query and the at least one past query, and based on a third similarity score between the formulated query and the at least one past query;
extracting one or more contents based on the formulated query if updated first similarity score is greater than a first threshold; and
providing the one or more contents.

2. The method as claimed in claim 1, wherein identifying the at least one past query comprises:
identifying a past query for which similarity score between the input query and the past query exceed a second threshold as the at least one past query, the past query being identified from a query history associated with a user.

3. The method as claimed in claim 1, wherein the updated first similarity score is determined as $$s^{new}(q, r) = w_0 s(q, r) + (1-w_0)\Sigma^m_{i=1}[s(v_i, r)*s(q, v_i)/\Sigma_j s(q, v_j)]$$

where s new (q, r) is the updated first similarity score,
s(q, r) is the first similarity score,
q is the input query,
r is the formulated query,
$s(q, v_i)$ is the second similarity score,
$v_i$ is the at least one past query,
s(vi, r) is the third similarity score,
$w_0 = 1 - w_h * \beta$,
$w_h$ is weight history,
$\beta = 0.0$, if [max $s(q, v_i) < \alpha$] else $\beta = $ max $s(q, v_i) < \alpha$.

4. The method as claimed in claim 1, wherein the one or more contents comprises:
one or more advertisements.

5. The method as claimed in claim 1 and further comprising:
electronically disambiguating the formulated query if the updated similarity score is not greater than the first threshold.

6. An article of manufacture comprising:
a non-transitory machine-readable medium; and
instructions carried by the machine-readable medium and operable to cause a programmable processor to perform:
identifying a formulated query and at least one past query associated with an input query;
determining a first similarity score between the input query and the formulated query;
updating the first similarity score based on the formulated query, the input query, and the at least one past query, wherein updating the first similarity score includes updating the first similarity score based on a second similarity score between the input query and the at least one past query, and based on a third similarity score between the formulated query and the at least one past query;
extracting one or more contents based on the formulated query if updated first similarity score is greater than a first threshold; and providing the one or more contents.

7. The article of manufacture as claimed in claim 6, wherein identifying the at least one past query comprises:
identifying a past query for which similarity score between the input query and the past query exceed a second threshold as the at least one past query, the past query being identified from a query history associated with a user.

8. The article of manufacture as claimed in claim 6, wherein the updated first similarity score is determined as $$s^{new}(q, r) = w_0 s(q, r) + (1-w_0)\Sigma^m_{i=1}[s(v_i, r)*s(q, v_i)/\Sigma_j s(q, v_j)]$$

where $s^{new}(q, r)$ is the updated first similarity score,
$s(q, r)$ is the first similarity score,
q is the input query,
r is the formulated query,
$s(q, v_i)$ is the second similarity score,
$v_i$ is the at least one past query,
$s(v_i, r)$ is the third similarity score,
$w_0 = 1 - w_h * \beta$,
$w_h$ is weight history,
$\beta = 0.0$, if [max $s(q, v_i) < \alpha$] else $\beta = $ max $s(q, v_i) < \alpha$.

9. The article of manufacture as claimed in claim 6, where the one or more contents comprises:
one or more advertisements.

10. The article of manufacture as claimed in claim 6 and further comprising instructions operable to cause the programmable processor to perform:
electronically disambiguating the formulated query if the updated similarity score is not greater than the first threshold.

11. A server comprising:
a server communication interface;
a server memory to store server instructions; and
a server processor coupled to the server memory and responsive to the server instructions to identify a formulated query and at least one past query associated with an input query;
determine a first similarity score between the input query and the formulated query;
update the first similarity score based on the formulated query, the input query, and the at least one past query, wherein updating the first similarity score includes updating the first similarity score based on a second similarity score between the input query and the at least one past query, and based on a third similarity score between the formulated query and the at least one past query;
extract one or more contents based on the formulated query if updated first similarity score is greater than a first threshold; and
provide the one or more contents.

12. The server as claimed in claim 11, wherein the server is in electronic communication with at least one of:
an advertising unit to obtain the one or more contents, the one or more contents comprising one or more advertisements; and
a storage device to obtain the one or more contents, the one or more contents comprising one or more advertisements.

13. The server as claimed in claim 11, wherein the server is in electronic communication with at least one electronic device to receive the input query; and
provide the one or more contents, wherein providing the one or more contents comprises displaying one or more advertisements on the at least one electronic device.

14. A method comprising:
identifying an object associated with an input query and at least one past query associated with the input query;
determining a first similarity score between the input query and the object,
electronically updating the first similarity score based on the object, the input query, and the at least one past query, wherein updating the first similarity score includes updating the first similarity score based on a second similarity score between the input query and the at least one past query, and based on a third similarity score between the formulated query and the at least one past query;
providing object if updated first similarity score is greater than a first threshold.

15. The method as claimed in claim 14, wherein identifying the at least one past query comprises:
identifying a past query for which similarity score between the input query and the past query exceed a second threshold as the at least one past query, the past query being identified from a query history associated with a user.

16. The method as claimed in claim 14, wherein the updated first similarity score is determined as $$s^{new}(q, r) = w_0 s(q, r) + (1-w_0)\Sigma^m_{i=1}[s(v_i, r)*s(q, v_i)/\Sigma_j s(q, v_j)]$$

where $s^{new}(q, r)$ is the updated first similarity score,
$s(q, r)$ is the first similarity score,
q is the input query,
r is the object,
$s(q, v_i)$ is the second similarity score,
$v_i$ is the at least one past query,
$s(v_i, r)$ is the third similarity score,
$w_0 = 1 - w_h * \beta$,
$w_h$ is weight history,
$\beta = 0.0$, if [max $s(q, v_i) < \alpha$] else $\beta = $ max $s(q, v_i) < \alpha$.

17. The method as claimed in claim 14, wherein the object comprises an advertisement.

* * * * *